(12) United States Patent
Kim et al.

(10) Patent No.: US 8,947,367 B2
(45) Date of Patent: Feb. 3, 2015

(54) CHARACTER INPUT APPARATUS AND CHARACTER INPUT METHOD

(75) Inventors: Yong Gu Kim, Seoul (KR); Joon-ho Won, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1358 days.

(21) Appl. No.: 12/360,226

(22) Filed: Jan. 27, 2009

(65) Prior Publication Data

US 2009/0322692 A1   Dec. 31, 2009

(30) Foreign Application Priority Data

Jun. 25, 2008  (KR) .................. 10-2008-0060181

(51) Int. Cl.
- *G06F 3/041* (2006.01)
- *G06F 3/023* (2006.01)
- *G06F 3/0488* (2013.01)

(52) U.S. Cl.
CPC .......... *G06F 3/0236* (2013.01); *G06F 3/04883* (2013.01)
USPC .......................................... 345/173; 715/863

(58) Field of Classification Search
CPC ................ G06F 3/04883; G06F 3/0236
USPC ............ 341/20, 22, 34; 345/619, 689, 173; 715/700, 764, 810, 817, 619, 689
See application file for complete search history.

(56) References Cited

U.S. PATENT DOCUMENTS

| | | | | |
|---|---|---|---|---|
| 5,908,997 A * | 6/1999 | Arnold et al. | ............ | 84/615 |
| 5,917,476 A * | 6/1999 | Czerniecki | ............ | 345/173 |
| 5,956,021 A * | 9/1999 | Kubota et al. | ............ | 345/179 |
| 6,002,390 A * | 12/1999 | Masui | ............ | 345/173 |
| 6,094,197 A * | 7/2000 | Buxton et al. | ............ | 715/863 |
| 6,169,538 B1 * | 1/2001 | Nowlan et al. | ............ | 345/168 |
| 6,295,052 B1 * | 9/2001 | Kato et al. | ............ | 345/179 |
| 6,542,171 B1 * | 4/2003 | Satou et al. | ............ | 715/833 |
| 6,741,235 B1 * | 5/2004 | Goren | ............ | 345/173 |
| 7,508,380 B2 * | 3/2009 | Chung | ............ | 345/171 |
| 8,018,432 B1 * | 9/2011 | Chakravarty et al. | ............ | 345/156 |
| 8,018,441 B2 * | 9/2011 | Shin et al. | ............ | 345/173 |

(Continued)

FOREIGN PATENT DOCUMENTS

| | | |
|---|---|---|
| KR | 2004-16365 | 2/2004 |
| KR | 20040016365 A | 2/2004 |

(Continued)

OTHER PUBLICATIONS

Merriam-Webster definition for "touch screen", downloaded from: http://www.merriam-webster.com/dictionary/touch+screen on Jun. 13, 2013.*

(Continued)

*Primary Examiner* — Dorothy Harris

(74) *Attorney, Agent, or Firm* — Jefferson IP Law, LLP

(57) ABSTRACT

A character input apparatus to input a character using a touch and drag method, the character input apparatus including: an interface to display a character on a touched location, if a touch is detected on the interface; a control unit to control the interface to change the displayed character and a location of the displayed character according to a dragging trace, if the touched location is dragged; and an input unit to input the displayed character displayed when the touch is completed. Accordingly, characters may be conveniently input on a narrow screen.

20 Claims, 13 Drawing Sheets

(56) References Cited

U.S. PATENT DOCUMENTS

| | | | |
|---|---|---|---|
| 8,044,937 B2* | 10/2011 | Shin et al. | 345/168 |
| 2002/0000978 A1* | 1/2002 | Gerpheide | 345/173 |
| 2003/0014239 A1* | 1/2003 | Ichbiah et al. | 704/7 |
| 2003/0064736 A1 | 4/2003 | Bickerton et al. | |
| 2004/0104896 A1* | 6/2004 | Suraqui | 345/168 |
| 2004/0107268 A1* | 6/2004 | Iriya et al. | 709/219 |
| 2004/0160419 A1* | 8/2004 | Padgitt | 345/173 |
| 2005/0225538 A1* | 10/2005 | Verhaegh | 345/173 |
| 2006/0248457 A1* | 11/2006 | Yamamoto et al. | 715/535 |
| 2007/0008300 A1* | 1/2007 | Yang et al. | 345/173 |
| 2007/0097085 A1* | 5/2007 | Iwatsuki | 345/173 |
| 2007/0126709 A1* | 6/2007 | Chen et al. | 345/173 |
| 2007/0152980 A1* | 7/2007 | Kocienda et al. | 345/173 |
| 2007/0247436 A1* | 10/2007 | Jacobsen | 345/173 |
| 2007/0273659 A1* | 11/2007 | XiaoPing et al. | 345/173 |
| 2008/0016460 A1* | 1/2008 | Park | 715/783 |
| 2008/0122794 A1* | 5/2008 | Koiso | 345/173 |
| 2008/0158151 A1* | 7/2008 | Wang et al. | 345/156 |
| 2009/0058823 A1* | 3/2009 | Kocienda | 345/173 |
| 2009/0144667 A1* | 6/2009 | Christoffersson et al. | 715/863 |
| 2009/0207053 A1 | 8/2009 | Lee | |
| 2011/0032200 A1* | 2/2011 | Park et al. | 345/173 |

FOREIGN PATENT DOCUMENTS

| | | |
|---|---|---|
| KR | 10-690292 | 2/2007 |
| KR | 10-770936 | 10/2007 |
| KR | 2008-54718 | 6/2008 |
| WO | WO 2008/020671 | 2/2008 |

OTHER PUBLICATIONS

Search Report and Written Report issued by International Searching Authority in International Patent Application No. PCT/KR2009/000596 on Sep. 22, 2009.

* cited by examiner

CHARACTER INPUT APPARATUS AND CHARACTER INPUT METHOD

CROSS-REFERENCE TO RELATED APPLICATION

This application claims the benefit of Korean Patent Application No. 2008-60181, filed in the Korean Intellectual Property Office on Jun. 25, 2008, the disclosure of which is incorporated herein by reference.

BACKGROUND OF THE INVENTION

1. Field of the Invention

Aspects of the present invention relate to a character input apparatus and a character input method, and more particularly, to a character input apparatus in which characters are input using a touch and drag method, and a character input method.

2. Description of the Related Art

Recently developed mobile devices (such as mobile phones, personal digital assistants (PDAs), portable multimedia players (PMPs), etc.) have emphasized a design that is convenient for carrying. Such devices employ a physical user interface (PUI) having a touch sensor (such as a touch screen, a touch pad, and/or a touch key) instead of hard keys, and application software receiving input characters using the touch sensor is mounted therein.

Mobile terminals using a related art touch screen employ a soft key pad input method and a handwriting recognition method as character input methods. The soft key pad input method refers to a method in which a terminal having a touch screen displays an input window of a key pad type on the touch screen, and may be touched (for example, by a stylus pen, a finger, etc.). The handwriting recognition method refers to a method in which a terminal recognizes handwritten letters (i.e., cursive letters), and converts the recognized letters into a data code. The soft key pad has a limitation in that a keyboard displayed on a narrow display window is limited in size. The handwriting recognition method has a limitation in that recognizing various cursive letters is difficult. For example, when a search function in an MPEG layer 3 (MP3) player is used, when a destination is input in a navigation system, or when a pin code is input to set a Bluetooth network, it is difficult to input letters using a soft key pad as a touch sensor has a narrow surface. Therefore, errors frequently occur when letters are input.

Accordingly, there is a need for methods to easily input letters on a narrow touch sensor.

SUMMARY OF THE INVENTION

Aspects of the present invention relate to a character input apparatus to input letters using a touch and drag method, and a character input method.

According to an aspect of the present invention, there is provided a character input apparatus to receive character inputs through a touch, the apparatus including: an interface to display a character on a touched location, if a touch is detected on the interface; a control unit to control the interface to change the displayed character and/or a location of the displayed character according to a dragging trace if the touched location is dragged on the interface; and an input unit to input the displayed character when the touch is completed.

The interface may display a character corresponding to the touched location on the touched location.

The input unit may display a character input window to show the input character.

The interface and the input unit may be formed as a single touch screen panel.

The control unit may display characters in a predetermined order according to a distance moving from an initially touched location.

The control unit may display the characters in a predetermined order according to a distance from the initially touched location in a predetermined direction.

If a touch is initially performed, the control unit may display a predetermined character corresponding to the initially touched location.

The interface may display a guide line to guide the dragging trace.

The dragging trace may be a free curve, and the control unit may change the displayed character according to a variation in an X axis component and/or a Y axis component.

The interface may include a first touch area to input characters of a first mode; and a second touch area to input characters of a second mode, wherein the first and second touch areas are provided in different directions.

According to another aspect of the present invention, the character may be a Korean consonant, a Korean vowel, Roman, Japanese hiragana, Japanese katakana, Chinese, Greek, a special character, a symbol, a figure, or a number.

According to another aspect of the present invention, there is provided a character input method to receive character inputs through a touch, the method including: displaying a character on a touched location, if a touch is detected on an interface; changing the displayed character and/or a location of the displayed character according to a dragging trace if the touched location is dragged; and inputting the displayed character when the touch is completed.

The displaying may include displaying a character corresponding to the touched location on the touched location.

The method may further include displaying a character input window to show the input character.

The changing of the displayed character may include displaying characters in a predetermined order according to a distance moving from the initially touched location.

The changing of the displayed character may include displaying the characters in a predetermined order according to the distance from the initially touched location in a predetermined direction.

If a touch is initially performed, the changing of the displayed character may include displaying a character corresponding to the touched location with respect to a predetermined location.

The method may further include displaying a guide line to guide the dragging trace.

The dragging trace may be a free curve, and the changing of the character may include changing the character according to a variation in an X axis component and/or a Y axis component.

Areas to detect the touch may include a first touch area to input characters of a first mode; and a second touch area to input characters of a second mode, wherein the first and second touch areas are provided in different directions.

The character may be a Korean consonant, a Korean vowels, Roman, Japanese hiragana, Japanese katakana, Chinese, Greek, a special character, a symbol, a figure, or a number.

According to yet another aspect of the present invention, there is provided a character input apparatus to receive character inputs through a touch, the apparatus including: an interface to display a character on a touched location if a touch is detected on the interface; and a control unit to control the interface to change the displayed character according to a dragging trace if the touched location is dragged on the interface.

According to still another aspect of the present invention, there is provided a character input method to receive character inputs through a touch on an interface, the method including: displaying a character on a touched location, if a touch is detected on the interface; and changing the displayed character according to a dragging trace if the touched location is dragged on the interface.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings, of which.

DETAILED DESCRIPTION OF THE EMBODIMENTS

Figure 1:
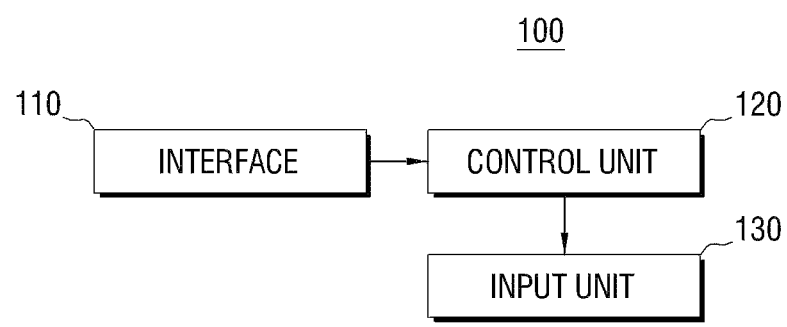
FIG. 1 is a block diagram illustrating a character input apparatus according to an embodiment of the present invention.

Reference will now be made in detail to the exemplary embodiments of the present invention, examples of which are illustrated in the accompanying drawings, wherein like reference numerals refer to like elements throughout. The embodiments are described below, in order to explain the present invention by referring to the figures.

FIG. 1 is a block diagram illustrating a character input apparatus 100 according to an embodiment of the present invention. Referring to FIG. 1, a character input apparatus 100 according to an embodiment of the present invention includes an interface 110, a control unit 120, and an input unit 130. The character input apparatus 100 may be applied to any apparatus having a touch sensor (for example, a navigation system, an electronic scheduler, a mobile phone, a personal digital assistant (PDA), a portable multimedia player PMP), or an MPEG layer 3 (MP3) player).

If a touch is detected, the interface 110 displays a character (such as a letter) on an area of the touched location. The character displayed on the area may be a character corresponding to the touched location, or the first character of a predetermined string of characters. The character may also vary according to a user's setting. The interface 110 may be implemented using a touch screen that detects the presence and/or location of a touch. The touch screen is a display wherein, if a user touches or contacts the display using a finger or other object (such as a stylus pen) without using a keyboard, the display senses the touched area and causes software to process corresponding operations. Furthermore, the touch screen may include a touch panel mounted on a screen of a monitor. Infrared rays are irradiated up and down and right and left on a screen of the touch panel, and a plurality of rectangular lattices are formed on the screen. Accordingly, if a user contacts the lattice with a finger or other object, the touch panel can detect the touched area.

If a user touches characters or images displayed on a screen having the touch panel, the touch panel detects an item selected by the user according to the touched location, and causes a computer to process a command corresponding to the item. Accordingly, the user can easily obtain desired information.

The interface 110 transmits a signal indicating the user touch to the control unit 120. The user touch may be performed using a finger or various objects (such as a stylus pen) for touching. If the control unit 120 receives the touch signal from the interface 110, the control unit 120 displays a character corresponding to the touch signal on an area of the touched location. Furthermore, if a dragging operation is performed, the control unit 120 controls the interface 110 to change character or the character location according to the dragging operation. The dragging operation is an action of touching an item and dragging the item to a different location or onto another item. The trace of the dragging operation may have various shapes with corresponding operations according to the user trace (for example, a straight line, a free curve, a parabola, a circle, a rectangle, or a diamond). Characters capable of being input may include various character sets (for example, scripts such as English, Korean, Roman, Japanese, Chinese, Greek, or Cyrillic scripts, or special characters, symbols, figures, or numbers, and various other characters of the past or future).

The input unit 130 inputs a character displayed when the touch is completed. The input unit 130 may be implemented separately, or may also be implemented with the interface 110 in a single body. Detailed descriptions for each case will be explained below. The input unit 130 may display a character input window to show the character to be input when the touch is completed. Also, the input unit 130 may be implemented using various display apparatuses (such as a liquid crystal display (LCD), a thin film transistor (TFT), or an Organic ElectroLuminescence (EL)).

Figure 2:
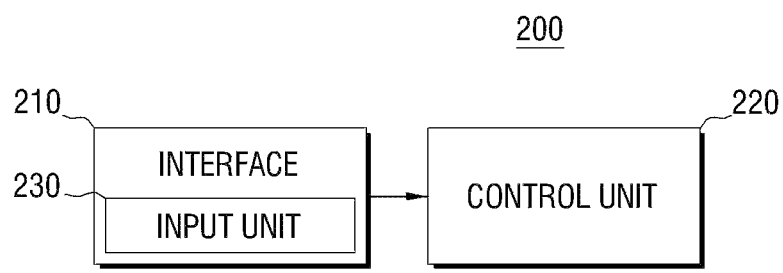
FIG. 2 is a block diagram illustrating a character input apparatus according to another embodiment of the present invention.

FIG. 2 is a block diagram illustrating a character input apparatus 200 according to another embodiment of the present invention. Referring to FIG. 2, the character input apparatus 200 includes an interface 210, a control unit 220, and an input unit 230. The input unit 230 is mounted in the interface 210. Elements illustrated in FIG. 2 that are also illustrated in FIG. 1 will not be explained below.

The interface 210 and the input unit 230 may be a single touch screen panel. Specifically, the input unit 230 may be formed within a predetermined area of the interface 210 not sensitive to touch.

In the embodiments of the present invention illustrated in FIGS. 1 and 2, the control unit 120, 220 may display predetermined characters in order according to a distance from the area on which the touch is initially performed. That is, the predetermined characters may be displayed in order taking into consideration the dragging distance irrespective of a dragging direction. For example, if a user drags a finger or an object on the touch screen along the X-axis for a distance d, along the Y-axis for the distance d, in an XY direction for the distance d, or in a YX direction for the distance d, the same character is displayed on the touch screen for each case. However, it is understood that aspects of the present invention are not limited thereto. For example, the control unit 120, 220 may display predetermined characters in order according to a distance toward a predetermined direction. For example, if the points on a dragging path are point p and point q, predetermined characters may be displayed according to the distance between point P' and point q' to which points p and q penetrate along the X and Y axes.

The interface 110, 210 may display a guide line to guide a touch area. The guide line may be formed in a straight line, and scale marks may be marked on locations corresponding to the predetermined characters. Furthermore, the guide line may be formed in various shapes (such as a circle, an oval, a square, a diamond, or a curve).

If dragging is performed in a free curve, the control unit 120, 220 may display a character on an area of the location on which the dragging occurs according to the predetermined direction (for example along the Y axis or X axis).

The control unit 120, 220 may display a character corresponding to the touched location on an area of the touched location such that a user can recognize a character corresponding to the touched location. For example, the area of the touched location may be the left, right, top, or bottom of the touched location.

The control unit 120, 220 may input a character corresponding to the location on which the touch is completed (that is, the character that a user desires to input on an input window displayed on the input unit 130, 230) using highlighting or a cursor. The completion of the touch refers to a completed contact of a finger or other object on the touch screen (for example, when a contact stops or when there is no dragging operation for a predetermined period of time).

The interface 110, 210 may include a first touch area on which characters of a first mode are input and a second area on which characters of a second mode are input. For example, the first touch area may be an area on which Korean consonants are input, and the second touch area may be an area on which Korean vowels are input. Additionally or alternatively, the first touch area may be an area on which English lowercase letters are input, and the second touch area may be an area on which English uppercase letters are input. The first and second touch areas may be placed in different directions. For example, if the first touch area is provided horizontally, the second touch area may be provided vertically. An embodiment related to the above will be explained below.

Figure 3:
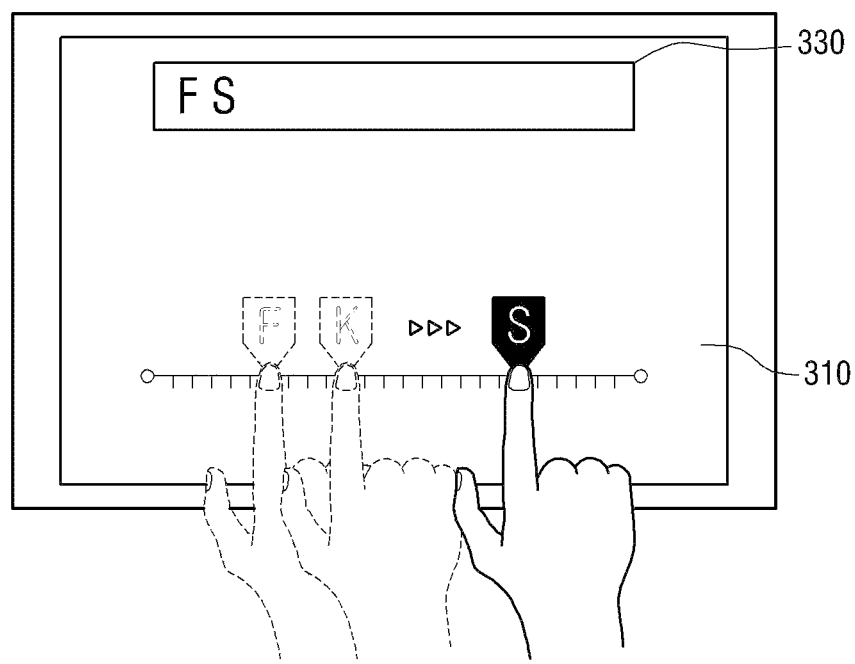
FIGS. 3 and 4 are drawings explaining a case in which an input unit and an interface are implemented in a single body according to an embodiment of the present invention.
Figure 4:
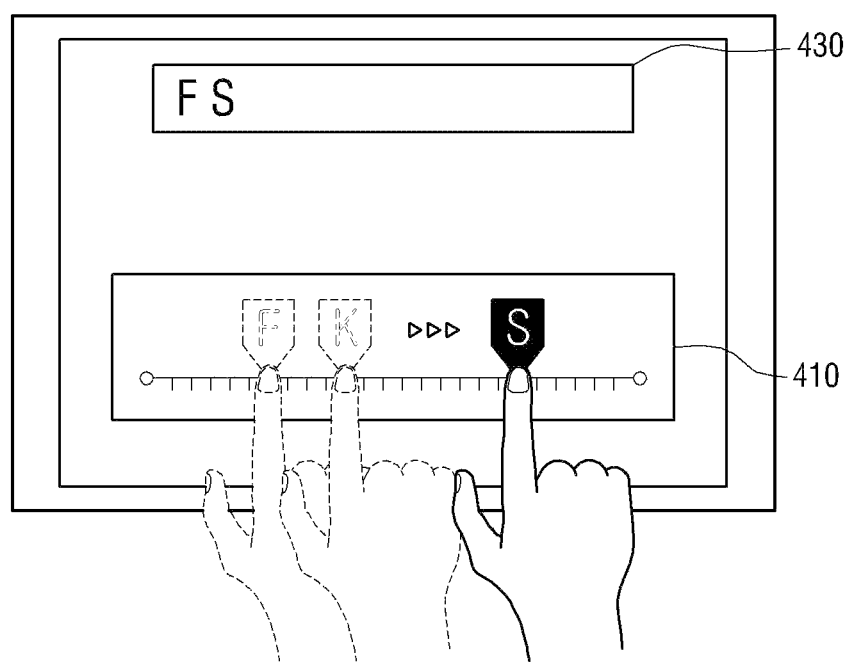

FIGS. 3 and 4 are drawings explaining a case in which an input unit 330 and an interface 310 are implemented in a single body according to an embodiment of the present invention. Referring to FIG. 3, the input unit 330 is provided on an area of an input apparatus 300 that is not implemented as a touch screen 310. A guide area 311 to guide a touch area is provided on an area of the interface 310. If a user drags his or her finger or an object along the guide area 311, predetermined characters are displayed on an area of the touched location according to the distance from the location on which the touch is initially performed. Characters are not displayed if a user does not touch the touch screen. The character corresponding to the touched location is displayed after the touch is performed, and the character and the location of the character change according to the dragging operation.

While a touch location to input a character is displayed in FIG. 3, various menu buttons to perform the operations of the input device 300 or the operations provided by apparatuses having the input device 300 may be formed on the touch screen as soft keys.

Areas other than the input unit 330 form a touch screen 310 in this embodiment of the present invention, but the touch screen 410 may be provided on a smaller area, as shown in FIG. 4.

Figure 5:
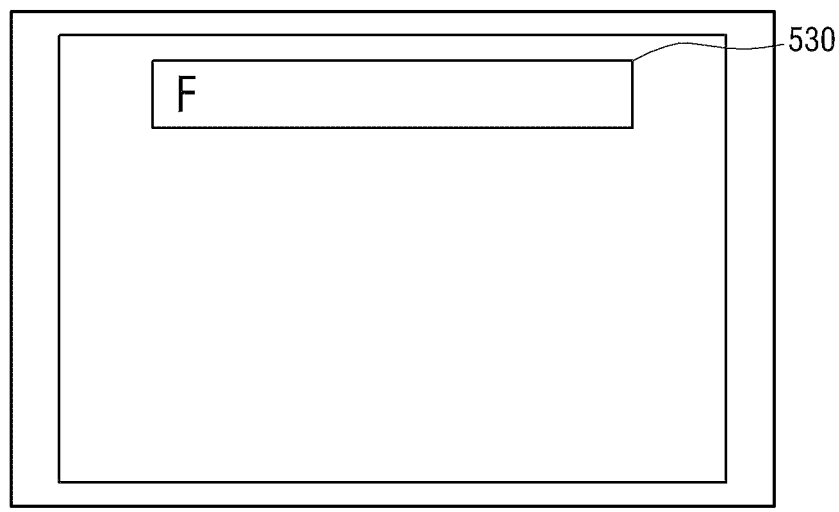
FIG. 5 is a view explaining a case in which an input unit is implemented separately from an interface according to another embodiment of the present invention.
Figure 5:
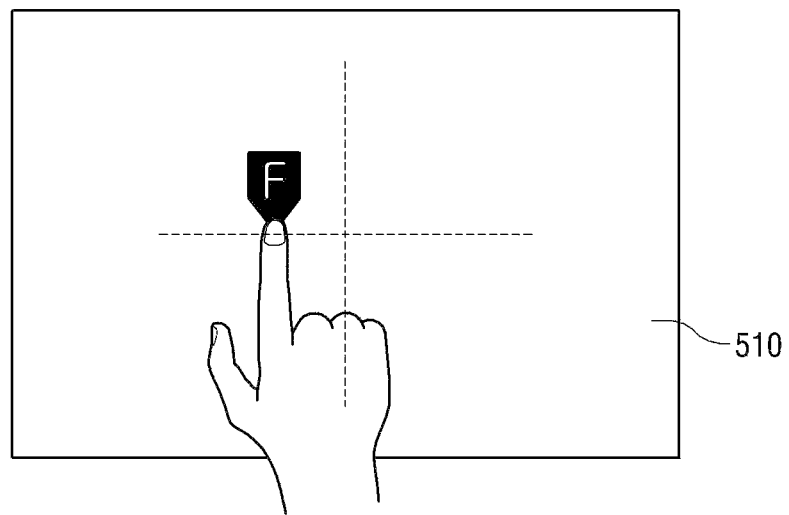

FIG. 5 is a view explaining a case in which an input unit 530 is implemented separately from an interface 510 according to another embodiment of the present invention. Referring to FIG. 5, an input device 500 includes the input unit 530 and the interface 510, which are formed separately. An area including the input unit 530 displays characters input through the interface 510 that is implemented as a touch screen thereon. The area including the input unit 530 may display thereon menus to perform operations provided by the input device or operations provided by an apparatus having the input device 500.

Figure 6A:
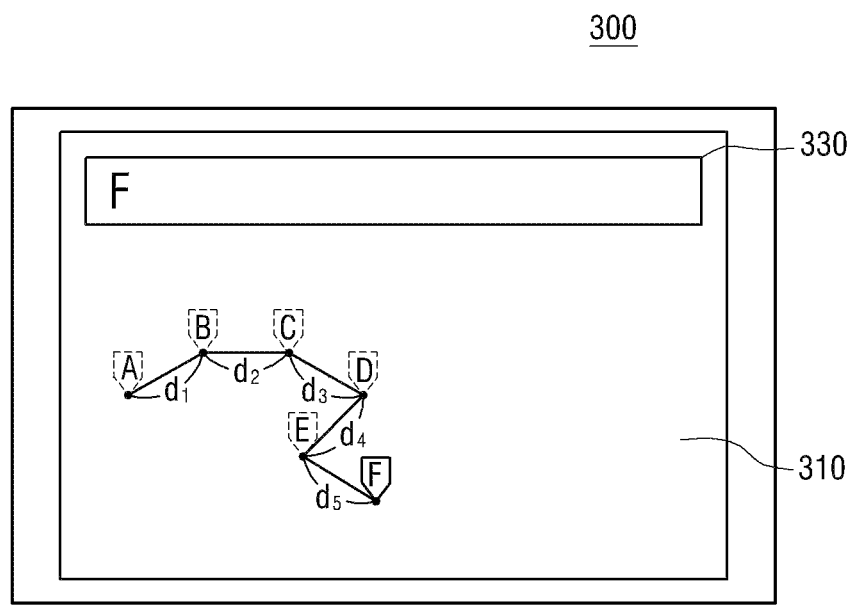
FIGS. 6A to 6C are views explaining various methods of displaying characters corresponding to a dragging operation according to an embodiment of the present invention.
Figure 6B:
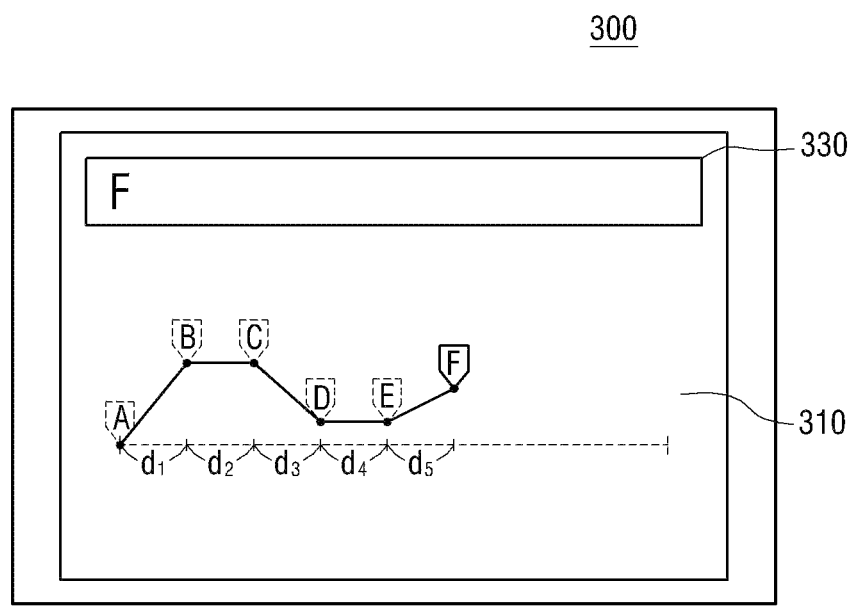
Figure 6C:
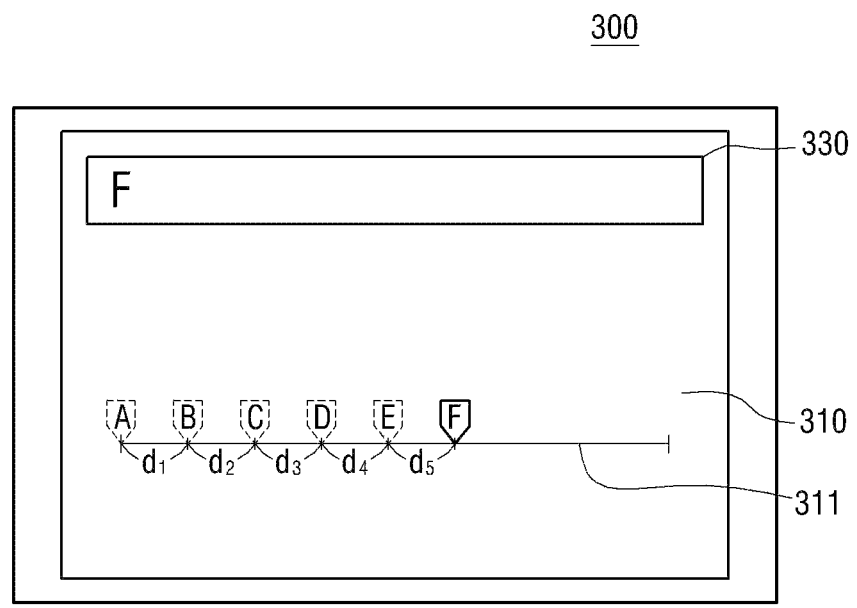

Hereinafter, a touch screen panel having the input unit 330 and the interface 310 as a single body will be explained for convenience of description. FIGS. 6A to 6C are views explaining various methods of displaying characters corresponding to the dragging operation according to an embodiment of the present invention. Specifically, in FIGS. 6A and 6B, a trace of a dragging operation is formed as a free curve.

Referring to FIG. 6A, a character corresponding to a distance d1 to d5 dragged on the touch screen is be displayed. That is, whenever a user drags a finger or an object from the initially touched location the same distance d1 to d5, a character corresponding to the dragged distance d1 to d5 is displayed. If a user drags a finger or an object the corresponding distance irrespective of the dragging direction, the predetermined following character is displayed. Specifically, if the initially touched location corresponds to the letter "A," and if a user drags a finger or an object as much as d1, the letter "B" is displayed, and if the user drags the finger or object as much as d2 (which is equal to d1), the letter "C" is displayed. In this situation, if the user stops touching the touch screen while letter "F" is displayed, letter "F" is input to the input unit 330.

Referring to FIG. 6B, the characters corresponding to each distance between the points projected on a reference axis (for example, an X axis), may be displayed according to the dragging operation. In this embodiment of the present invention, the same distance is assigned to d1 to d5. If a user drags a finger or an object from one location to another location, if a location prior to dragging and a location after dragging are projected on an X axis, and if the distance between the projected locations corresponds to the predetermined distance, the predetermined following character may be displayed. Specifically, if the initially touched location corresponds to the letter "A," and if a user drags a finger or an object as much as d1 along the X axis, the following letter "B" is displayed, and if the user drags the finger or object as much as d2 (which is equal to d1) along the X axis, the following letter "C" is displayed. In this situation, if a user stops touching the touch screen while the letter "F" is displayed, letter "F" is input to the input unit 330.

FIG. 6C is a view provided to explain a case in which a guide area to guide a touch area within a touch screen panel is displayed. Referring to FIG. 6C, the guide area 311 to guide the touch area is displayed on a touch screen panel, and a user may input a desired character by dragging a finger or an object along the guide area 311. Accordingly, if a user drags a finger or an object along the guide area 311, and completes touching the touch screen while the letter "F" is displayed, the letter "F" is input to the input unit 330.

Figure 7A:
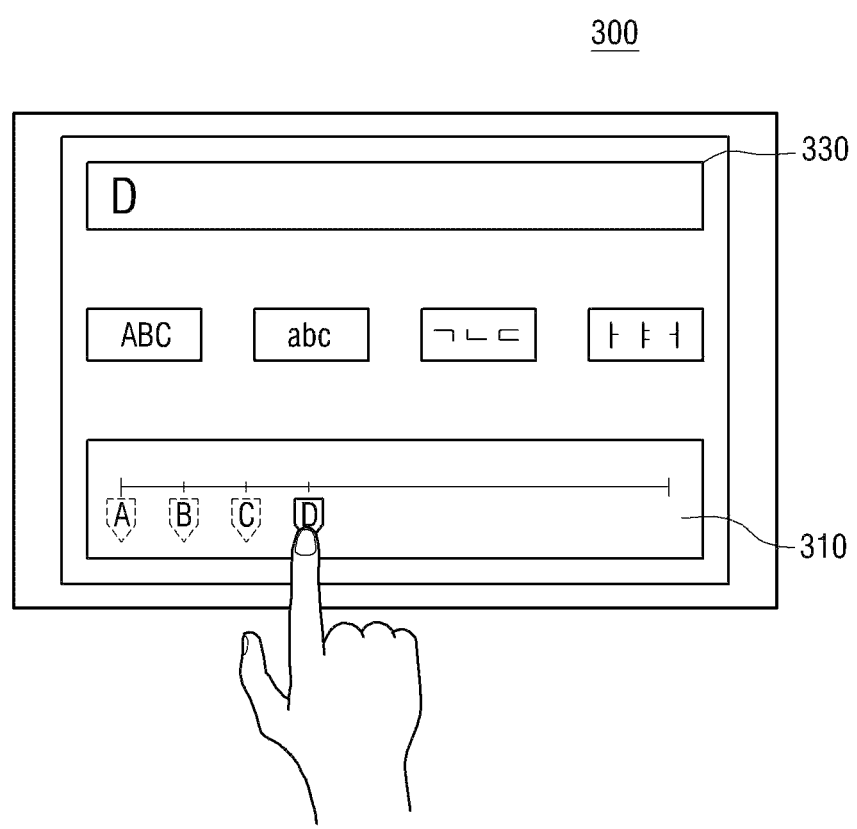
FIGS. 7A and 7B are views explaining a method of inputting various types of characters according to an embodiment of the present invention.
Figure 7B:
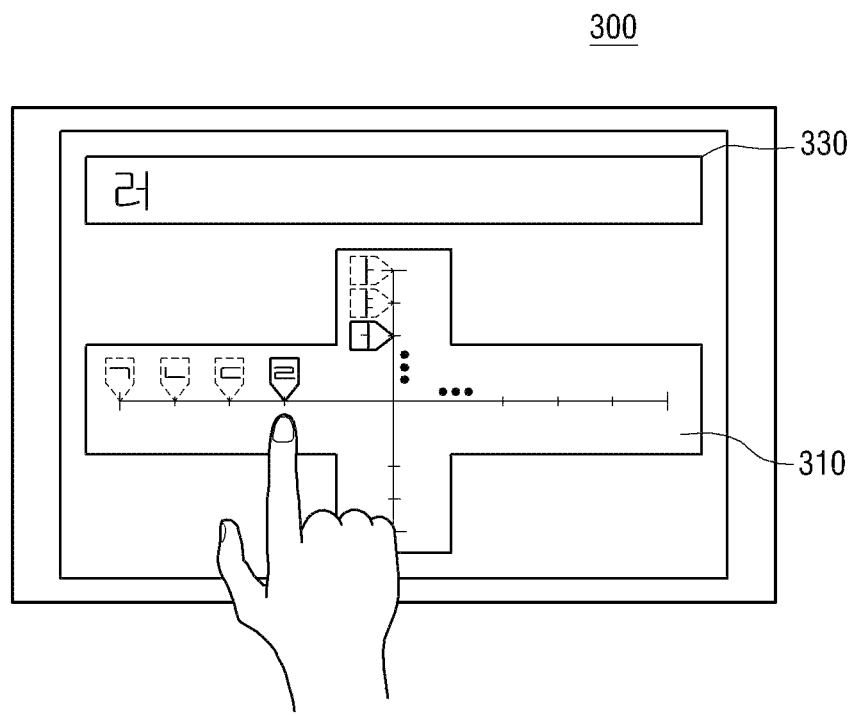

FIGS. 7A and 7B are views explaining a method of inputting various types of characters according to an embodiment of the present invention. Referring to FIG. 7A, the touch screen 310 provides a single input mode to input characters, and mode keys "ABC," "abc," "ㄱ ㄴ ㄷ," and "ㅏ ㅑ ㅓ" may be additionally provided to change the character input mode.

Referring to FIG. 7B, the touch screen 310 includes at least two touch areas to input characters of at least two input modes without selecting an input mode, and the respective areas may be provided to have a predetermined width. For example, a horizontal area is provided to input English consonants, and a vertical area is provided to input English vowels. While the English consonants and vowels are provided as examples in this embodiment of the present invention, it is understood that different character sets (such as English upper and lowercase letters, Korean consonants and vowels, or Japanese hiragana and katakana) may be input on the corresponding areas.

Figure 8:
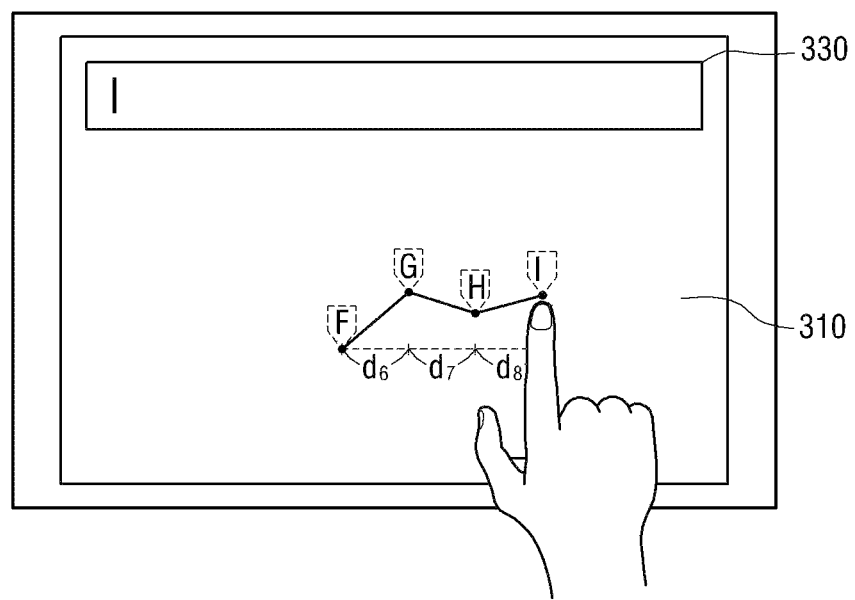
FIG. 8 is a view explaining a character that is displayed when a screen is initially touched according to an embodiment of the present invention.

FIG. 8 is a view explaining a character that is displayed when a screen is initially touched according to an embodiment of the present invention. Referring to FIG. 8, when a touch is initially performed on the interface 310, the letter "F" corresponding to the initially touched area may be displayed on an area of the touched location according to a distance from a reference location, while the letter "I" displayed when the touch is completed may be input to the input unit 330. If the touch is performed initially on the interface 310, a first character of predetermined characters (for example, "A") may be displayed on an area of the touched location. In this embodiment, if each area projected to an X axis corresponds to a predetermined distance, the predetermined following letter is displayed. A user may complete the touch by changing a direction of the dragging trace. Furthermore, a user may complete the touch and begin a new drag trace for a next character to be input by changing the direction of the dragging trace.

Figure 9:
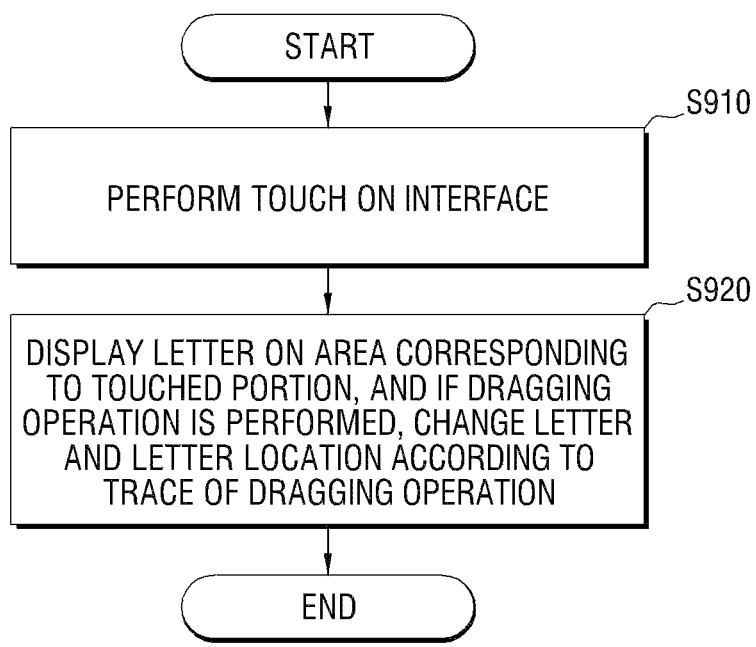
FIGS. 9 and 10 are flowcharts illustrating a method of inputting characters according to an embodiment of the present invention.
Figure 10:
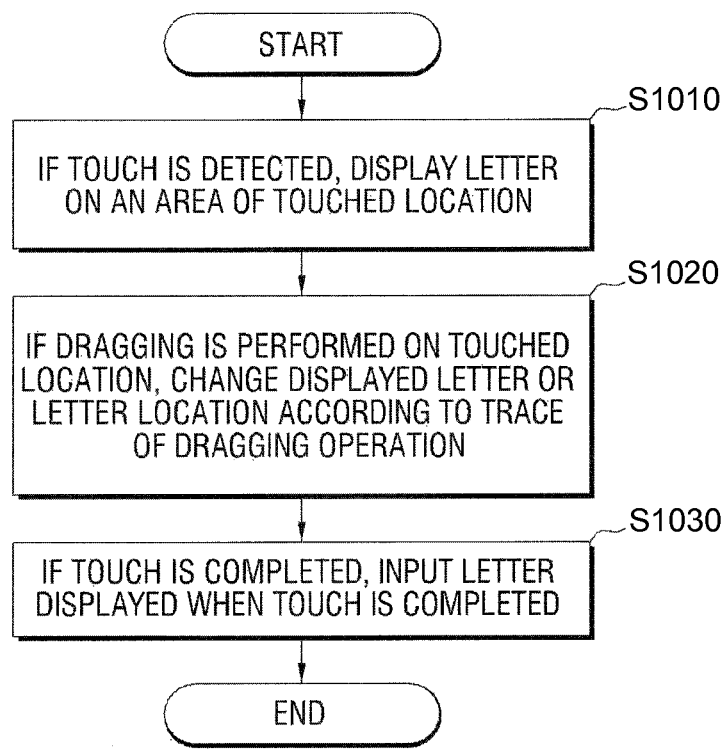

FIGS. 9 and 10 are flowcharts provided to explain a method of inputting characters according to an embodiment of the present invention. Referring to FIGS. 9 and 10, if the touch is detected, a character is displayed on an area of the touched location in operation S910 as illustrated in FIG. 9, or in operation S1010 as illustrated in FIG. 10. If the dragging is performed on the touched location, the displayed character and/or the character location are changed according to a trace of the dragging operation in operation S920 as illustrated in FIG. 9, or in operation S1020 as illustrated in FIG. 10. The character displayed on an area of the touched location may correspond to the touched location, or may be the first character of predetermined characters. The letter may also be changed according to a user's setting. If the touch is completed, the character displayed when the touch is completed is input to the input window in operation S1030 as illustrated in FIG. 10.

In operation S920 as illustrated in FIG. 9, or in operation S1020 illustrated in FIG. 10, the predetermined characters may be displayed in order according to a distance from an initially touched location. Furthermore, in operation S920 as illustrated in FIG. 9, or in operation S1020 as illustrated in FIG. 10, the predetermined characters may be displayed in order according to a distance in a predetermined reference direction. For example, if the trace of the dragging operation is a free curve, the character may change according to a changing gradient of at least one of components of X and Y axes. Also, in operation S920 as illustrated in FIG. 9, or in operation S1020 as illustrated in FIG. 10, when the touch is initially performed, a character corresponding to the touched area may be displayed with reference to the predetermined area.

According to aspects of the present invention, a guide line to guide a touch area may be displayed. The guide line may be formed as various shapes (for example a circle, an oval, a rectangle, a diamond, or a curve). Moreover, the trace of the dragging operation may be various shapes with corresponding operations, (for example a straight line, a free curve, a parabola, a circle, a rectangle, or a diamond) according to a user's trace.

The area to detect the touch may include a first touch area on which characters of a first mode are input and a second area on which characters of a second mode are input. Also, the first and second touch areas may be placed in different directions. The characters may, for example, be Korean consonants and vowels, upper and lowercase letters of the Roman, Greek or Cyrillic alphabets, Japanese hiragana and katakana, Chinese characters, special characters, symbols, figures, and numbers.

According to aspects of the present invention, various characters are easily input on a narrow touch sensor using a touch and drag method. That is, characters can be conveniently input on a touch sensor on which it is difficult to recognize cursive letters.

Aspects of the present invention can also be embodied as computer-readable codes on a computer-readable recording medium. Also, codes and code segments to accomplish the present invention can be easily construed by programmers skilled in the art to which the present invention pertains. The computer-readable recording medium is any data storage device that can store data which can be thereafter read by a computer system or computer code processing apparatus. Examples of the computer-readable recording medium include read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion. Aspects of the present invention may also be realized as a data signal embodied in a carrier wave and comprising a program readable by a computer and transmittable over the Internet.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A character input method to receive character inputs through a touch on a touch screen of an interface, the method comprising:
displaying an x-axis line intersecting a mid-region of a displayed y-axis line for guiding a user's touch input;
detecting a touch on at least one of the lines;
determining a character based on a touched location of the touched line;
displaying the character at the touched location;
changing the displayed character and a location of the displayed character on the touch screen according to a dragging trace along the touched line; and
inputting the character finally displayed above the touched location of the touched line on an area of the touchscreen other than the touched location, when the touch is terminated,
wherein a character set determined by touch for the x-axis is different from a character set determined by touch for the y-axis.

2. The method as claimed in claim 1, wherein the displaying of the character comprises displaying a first character corresponding to a first touched location on the touch screen when the first touched location is touched, and displaying a second character corresponding to a second touched location on the touch screen when the second touched location is touched.

3. The method as claimed in claim 1, further comprising: displaying a character input window to show the input character.

4. The method as claimed in claim 1, wherein the changing of the displayed character comprises displaying characters in a predetermined order according to a moving distance of the dragging trace from an initially touched location in a predetermined direction.

5. The method as claimed in claim 1, wherein when the touch is initially performed, the displaying of the character comprises displaying a predetermined character corresponding to the initially touched location.

6. The method as claimed in claim 1, wherein: the dragging trace is a free curve; and the changing of the displayed character comprises changing the displayed character according to a variation in an X axis component and/or a Y axis component of the dragging trace.

7. The method as claimed in claim 1, wherein the character is a Korean consonant, a Korean vowel, Roman, Japanese hiragana, Japanese katakana, Chinese, Greek, a special character, a symbol, a figure, or a number.

8. The method as claimed in claim 1, wherein the touch is completed when the touched location is not dragged for a predetermined period of time.

9. A non-transitory computer-readable recording medium encoded with the method of claim 1 and implemented by at least one computer.

10. The method as claimed in claim 1, wherein the dragging trace is one of a parabola, a circle, a rectangle or a diamond.

11. The method as claimed in claim 1, wherein the changing of the displayed character comprises displaying characters in a predetermined order according to a moving distance of the dragging trace from an initially touched location and wherein the displayed characters are not displayed until a user touches the at least one of the lines on the touch screen.

12. The method as claimed in claim 1, wherein the character set determined by touch for the x-axis is one of a Korean consonant and a Korean vowel and the character set determined by the y-axis is another one of the Korean consonant and the Korean vowel, or wherein the character set determined by touch for the x-axis is one of an English letter and a number and the character set determined by touch for the y-axis is another one of the English letter and the number, or wherein the character set determined by touch for the x-axis is one of the English letter and the special character and the character set determined by the y-axis is another one of the English letter and the special character.

13. A character input apparatus to receive character inputs through a touch on a touch screen of an interface, the apparatus comprising:
the touch screen of the interface to display an x-axis line intersecting a mid-region of a displayed y-axis line for guiding a user's touch input, to detect a touch on at least one of the lines, to determine a character based on a touched location of the touched line, and to display the character at the touched location;
a control unit to control the touch screen to change the displayed character and a location of the displayed character on the touch screen according to a dragging trace along the touched line; and
an input unit to input the displayed character finally displayed above the touched location of the touched line on an area of the touch screen other than the touched location when the touch is terminated,
wherein a character set determined by touch for the x-axis is different from a character set determined by touch for the y-axis.

14. The apparatus as claimed in claim 13, wherein the touch screen displays a first character corresponding to a first touched location on the touch screen when the first touched location is touched, and a second character corresponding to a second touched location on the touch screen when the second touched location is touched.

15. The apparatus as claimed in claim 13, wherein the input unit displays a character input window to show the input character.

16. The apparatus as claimed in claim 13, wherein the control unit displays characters in a predetermined order according to a moving distance of the dragging trace from an initially touched location in a predetermined direction.

17. The apparatus as claimed in claim 13, wherein when the touch is initially performed, the control unit displays a predetermined character corresponding to the initially touched location.

18. The apparatus as claimed in claim 13, wherein the dragging trace is a free curve, and the control unit changes the displayed character according to a variation in an X axis component and/or a Y axis component of the dragging trace.

19. The apparatus as claimed in claim 13, wherein the character is a Korean consonant, a Korean vowel, Roman, Japanese hiragana, Japanese katakana, Chinese, Greek, a special character, a symbol, a figure, or a number.

20. The apparatus as claimed in claim 13, wherein the touch is completed when the touched location is not dragged for a predetermined period of time.

* * * * *